INVENTOR.
RICHARD L. BERNHARD
BY
WILSON, SETTLE & CRAIG
ATTORNEYS

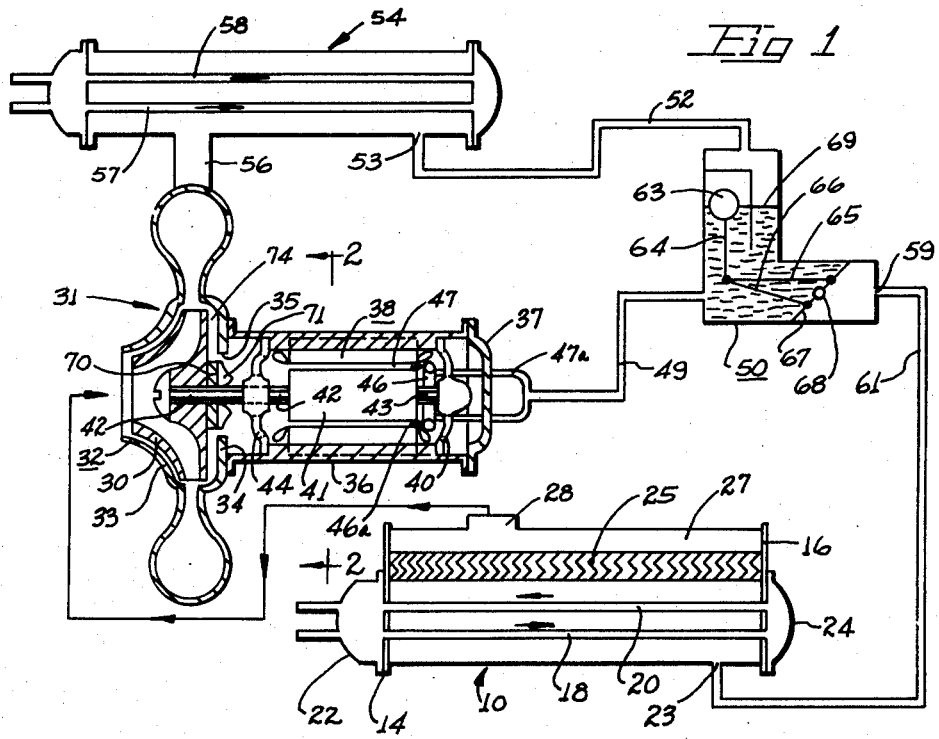
Fig 1
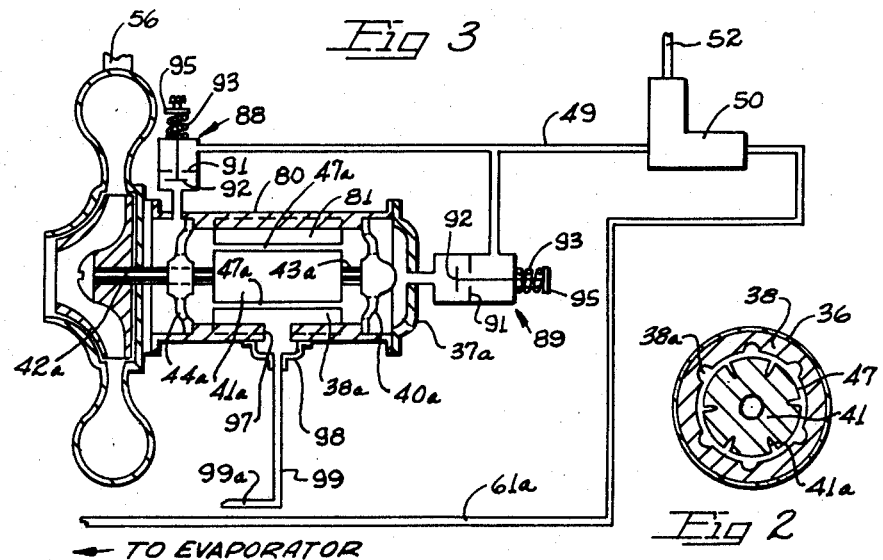
Fig 3
Fig 2
INVENTOR.
RICHARD L. BERNHARD
BY
SMITH, WILSON, LEWIS & McRAE

United States Patent Office 3,122,894
Patented Mar. 3, 1964

3,122,894
HERMETIC MOTOR COOLING BY DIRECT EXPANSION OF SYSTEM REFRIGERANT INTO MOTOR
Richard L. Bernhard, Birmingham, Mich., assignor to American Radiator & Standard Sanitary Corporation, New York, N.Y., a corporation of Delaware
Filed July 5, 1962, Ser. No. 208,188
13 Claims. (Cl. 62—117)

This invention relates to the cooling of dynamoelectric machines and more particularly to an improved system for cooling sealed motors such for example as motors employed to drive compressors of refrigeration systems.

This application is a continuation-in-part of my copending application Serial No. 126,825 filed July 24, 1961, now abandoned, and, in, turn, a continuation-in-part of application Serial No. 755,454 filed August 18, 1958, and now abandoned.

An important object of this invention is to provide a method for cooling dynamoelectric machines including electric motors and generators with vaporizable liquid refrigerants.

A further object of my invention is to provide a refrigerating system wherein the compressor motor is cooled by the liquid refrigerant being handled, thereby eliminating the dangers resulting from possible erratic cooling action which can occur with conventional water cooling systems.

A still further object of my invention is to provide an improved method of cooling electric motors and generators by injecting liquid refrigerant directly into and between the relatively movable rotor and stator elements.

Another object of my invention is to provide a method for cooling electric motors and generators by injecting liquid refrigerant directly into the rotor-stator gap.

Another object of my invention is to provide a cooling system for a sealed motor employed for example to drive a compressor which requires no cooling fluid other than the liquid refrigerant operated on by the compressor.

Still a further object of the invention is to provide a cooling system for a compressor motor having a minimum number of fluid lines, control valves and other devices to permit the construction and installation of the system as a relatively low-cost mechanism.

Another object of my invention resides in the provision of a compressor motor cooling system which can easily be constructed as a simplified, leak-free mechanism to promote trouble-free operation and reduce maintenance costs to a minimum.

Yet a further object of my invention is to provide an electric motor and generator cooling system in which a liquid refrigerant is injected into the device to have intimate contact with the parts to promote high heat transfer action for effecting rapid cooling.

Still another object of my invention is to provide a compressor motor cooling system in which a liquefied refrigerant is distributed throughout substantially all interior portions of the motor so as to prevent localized hot spots, thereby insuring improved motor performance and lengthened motor life.

Other objects of this invention will appear in the following description and appended claims, reference being had to the accompanying drawings forming a part of this specification wherein like reference characters designate corresponding parts in the several views.

In the drawings:

FIGURE 1 is a schematic view illustrating my improved cooling system applied to the cooling of an electric motor, preferably of the sealed type employed to drive a compressor of a refrigerant cycle;

FIGURE 2 is a sectional view taken substantially on the line 2—2 of FIGURE 1 looking in the direction of the arrows;

FIGURE 3 is a view illustrating a modified embodiment of my invention;

Figure 4:
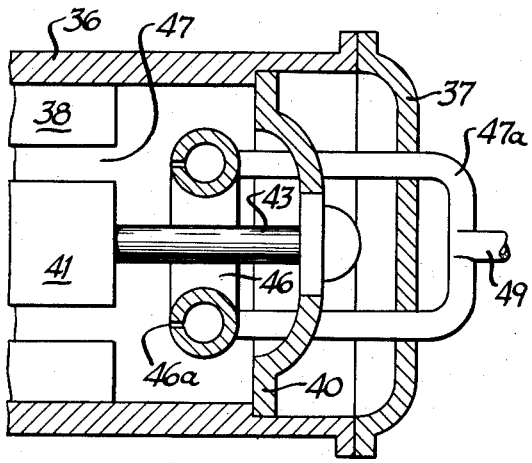
FIGURE 4 is an enlarged fragmentary section view similar to the right hand end of the motor of FIGURE 1 showing one form of liquid refrigerant distribution ring utilized to cool an electric motor or generator in accordance with the present invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a refrigerant system including an evaporator 10 formed of a cylindrical tank having tube sheets 14 and 16, between which extend a plurality of water tubes 18 and 20. Water boxes or bell ends 22 and 24 are secured to tube sheets 14 and 16 to provide a closed circuit for the passage of heat transfer fluid through tubes 18 and 20 in the directions indicated by the arrows. The water or other heat transfer fluid within tubes 18 and 20 is cooled by the boiling action of the liquid refrigerant which enters the evaporator at the inlet 23, the refrigerant gas passing through baffle structure 25. The baffle structure 25 functions to prevent the entrainment of liquid refrigerant in the evaporated refrigerant within the upper evaporator portion 27.

Gaseous refrigerant from outlet 28 of the evaporator 10 is fed into the inlet of an impeller 30 of a centrifugal compressor 31. The compressor 31 includes a housing 32 having a front wall 33 and a back wall 34 provided with a circular opening 35. Secured to the back wall 34 is a sealed electric motor having a cylindrical casing wall 36 closed by an end wall 37. The motor casing 36 mounts a conventional motor stator structure 38, as well as the spider-like bearing supporting members 40 and 44. Rotatably positioned within stator structure 38 is a rotor member 41 having shaft sections 42 and 43 projecting into bearings supported in the spider-like members 40 and 44.

As better shown in FIGURE 4, a liquid refrigerant distributor ring 46 is fixedly mounted in surrounding relationship to the shaft section 43. The distribution ring 46 is provided with a plurality of circumferentially spaced nozzle orifices 46a therein for spraying liquid refrigerant as small axially aligned streams directly into the gap 47 between the rotor 41 and the stator structure 38.

The spraying operation serves to distribute liquid refrigerant onto those portions of the motor which attain the highest operating temperature so as to very efficiently cool the motor and prevent localized hot spots. More particularly the liquid refrigerant enters the rotor-stator gap in an axial direction.

It will be understood that the gap 47 may be increased as shown in FIGURE 2 to facilitate more rapid flow of the refrigerant, and also the stator and rotor members 38 and 41 may be contoured with depressed sections as shown at 38a and 41a to admit sufficient refrigerant to provide desired cooling of the various parts of the motor.

Figure 5:
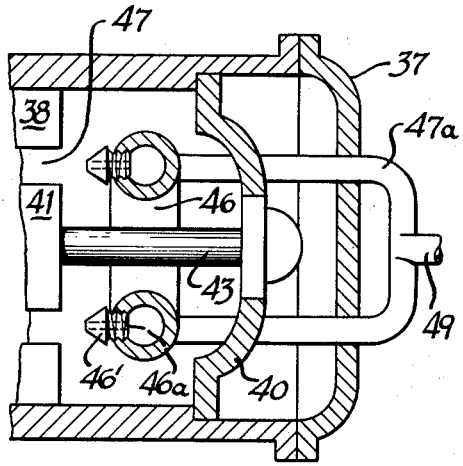
FIGURE 5 is an enlarged fragmentary section view of another form of liquid refrigerant distribution ring utilized in cooling an electric motor or generator in accordance with the present invention.

Adjustable inserts may be provided in ring 46 to vary the orifice area in accordance with desired operating pressures. This is better shown in FIGURE 5, which illustrates adjustable inserts 46' positioned within the orifices 46a formed in the liquid refrigerant distribution ring 46. These inserts are adapted to form streams of varying size or sprays for injecting liquid refrigerant directly, axially into the rotor-stator gap 47.

It should be pointed out with respect to the distributor ring 46, shown in FIGURES 3 and 4, that this may take the form of a hollow annular member of tubular or cylindrical cross section, as best illustrated in FIGURE 4. Also, it may take the form of a conduit of square or rectangular cross section, any hollow annular member being usable, so long as it is capable of conducting and distributing liquid refrigerant circumferentially around the rotor stator air gap 47.

Distributor ring 46 is fed with liquid refrigerant from one or more tubes 47a which extend through members 37 and 40. Tubes 47a are connected to a line 49 which extends from float chamber casing 50. Casing 50 receives condensed refrigerant from line 52 which extends from outlet 53 of refrigerant condenser 54.

During operation, the condenser 54 receives heated gaseous refrigerant from the compressor 31 through a line 56, the action being such that the circulation of heated refrigerant gases into the condenser is effective to heat the water in tubes 57 and 58, with a consequent condensing of the refrigerant. The refrigerant drains from outlet 53 into line 52 and thence into the float chamber formed by the casing 50.

Casing 50 is provided with an outlet 59 which connects with a refrigerant line 61 leading to inlet 23 of the evaporator 10. Within the casing 50 there is provided a float in the form of a hollow ball 63. Extending downwardly from the ball 63 is a rod 64 which pivotally connects with a linkage 65 and 66 connected to a butterfly valve 67 fulcrumed at 68.

In operation, if the drainage of liquid refrigerant from line 52 is not sufficient to maintain the liquid in casing 50 at substantially the illustrated level 69 the float 63 will be lowered so as to hold valve 67 closed as illustrated in FIGURE 1. Any tendency of the liquid to rise above the level 69 will elevate the float 63 so as to open the valve 67 for restoring the liquid level to substantially the illustrated level 69. In this manner there is always maintained a sufficient quantity of liquid refrigerant in the float chamber for supplying distribution ring 46 with refrigerant, and to form a liquid seal between the condenser outlet 53 and the evaporator inlet 23.

In order to assist the flow of refrigerant through gap 47 between the stator and rotor members of the motor, a pump is provided in the form of a plate 70 having a plurality of vanes 71 thereon to exert a suction effect on the space within the motor casing 36. Thus, during operation of the motor, the plate 70, mounted for conjoint rotation with shaft 42 and the impeller 30 draws refrigerant from the gap 47 through opening 35 and into passage 74 located in the compressor housing. In this manner a circulation of refrigerant through the compressor motor is attained with a minimum of piping.

It will be apparent that a highly efficient cooling cycle is thus provided because liquid refrigerant is injected through the nozzles 46a into the gap 47 between the stator and rotor members, and the refrigerant is expanded in the motor casing 36, thereby absorbing large quantities of heat as the liquid refrigerant expands to the gaseous state and is withdrawn by the vanes 71 into the compressor chamber and is discharged to the condenser 54 where the refrigerant is recondensed.

Referring to the embodiment of my invention illustrated in FIGURE 3, it will be noted that a compressor motor casing structure 80 is provided for mounting a stator structure 38a. Spider-like bearing supports are provided at 44 and 40 for rotatably mounting shaft sections 42a and 43a projecting from opposite ends of rotor 41a. Casing 80 is closed by an end wall 37a.

In order to cool the compressor motor there are provided two separate liquid refrigerant feeding devices 88 and 89. Each of these feeding devices includes an orifice-forming wall 91, an orifice restricting element 92 and a compression spring 93 or regulating stem for controlling the pressure drop taking place across the feeding device. A manually adjustable nut 95 is provided to vary the force exerted by the spring 93 or position of the stem to effect a control action on the rate of motor cooling.

In order to exhaust the refrigerant from within the gap 47a between the stator 38a and the rotor 14a there are provided one or more openings 97 in the casing wall 80. A fitting or manifolding header 98 connects openings 97 with a line 99 returning to a low pressure area of the refrigerating system.

The FIGURE 3 structure may be utilized with a condenser and evaporator (not shown) in the same manner as the system illustrated in FIGURE 1.

In connection with the FIGURE 3 embodiment it will be noted that refrigerant is caused to flow from the spaces adjacent the opposite ends of stator 38a axially through the rotor gap 47a and out through the discharge line 99, the operation being such as to promote an intimate contact of the refrigerant with those portions of the motor having the highest operating temperature, namely the rotor and stator. It will be apparent that very effective cooling is insured where the liquid refrigerant is introduced at opposite ends of the rotor and is permitted to flow down the gap 47a between the rotor and stator members to the manifolding outlets 97 positioned intermediate the ends of the stator. Liquefied refrigerant is injected and it is permitted to expand absorbing large quantities of heat and being withdrawn in the gaseous form by the differential of pressure between the inlet pressure and a low pressure area of the refrigerating cycle. In this manner a very efficient cooling operation is obtained.

Figure 6:
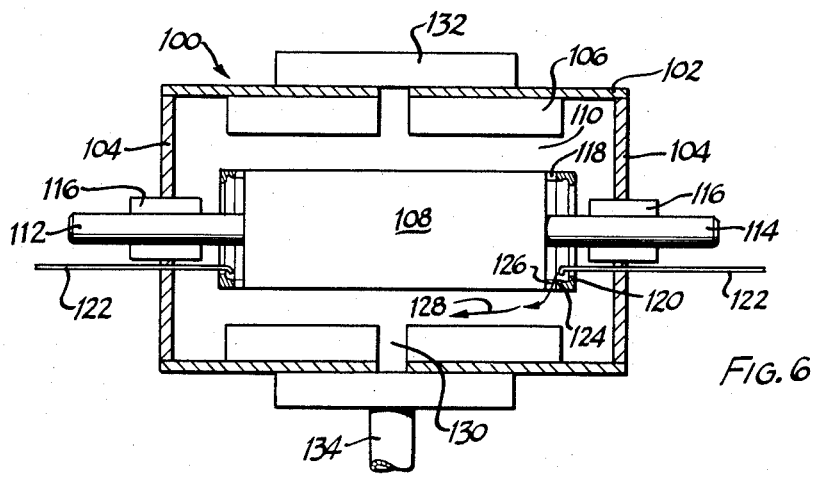
FIGURE 6 is a schematic section view showing another form of apparatus for injecting liquid refrigerant into an electric motor for cooling the same.

In FIGURE 6 there is illustrated still another method and apparatus whereby liquid refrigerant can be introduced into a motor or generator for cooling the same. In this embodiment, liquid refrigerant is introduced into each end of the sealed casing of the unit to be distributed into each end of the rotor-stator gap, thus providing highly efficient cooling of the rotor and stator. As shown in FIGURE 6, a motor or generator 100 includes a sealed cylindrical casing 102 having end walls 104. A stator 106 is positioned within the sealed casing 102 and rotatable rotor 108 is positioned in coaxial alignment within the stator in spaced relation therewith to provide an air gap 110 between the rotor 108 and the stator 106. The rotor 108 is provided coaxially thereof with support shaft segments 112 and 114 mounted in sealed gas proof bearings 116 carried by each of the motor end walls 104.

To each end of the rotor 108 there is fitted a plurality of circumferentially spaced bars 118 which extend axially from both ends of the rotor 108 to mount two circular liquid refrigerant-distribution channel or trough structures 120, one at each end of the rotor 108. The trough structures 120 are adapted to receive liquid refrigerant, as from any suitable source, such as the condenser of a refrigeration system provided solely for the motor 100 or from the condenser of a refrigeration system, the compressor of which the motor 100 can be drivingly connected. For this purpose, liquid refrigerant conduits 122 are passed in sealed relationship through each of the end walls 104 of the motor casing 102, terminating adjacent the inner periphery of the circular channels 120 to discharge liquid refrigerant directly into the channel members 120. The arrangement is such that during rotation of rotor 108 the trough structures 120 receive liquid refrigerant from the ends of liquid refrigerant conduits 122 and direct the liquid refrigerant by centrifugal force and spilling action over the lower lips 124 and between the circumferentially spaced bars 118 supporting the trough structures 120 and thence directly into the rotor-stator gap 110 in the direction of the arrows 126.

The liquid refrigerant is immediately vaporized, at least in part, absorbing large quantities of heat from both the stator 106 and the rotor 108. The vaporized refrigerant, along with any unvaporized portions thereof, passes in the arrow 128 direction axially of the rotor-stator gap toward a median portion thereof.

At the median portion of the stator 106 there is provided a plurality of radially extending and circumferentially spaced apertures 130 passing through the stator and connecting with an annular duct or housing 132 encompassing the stator to receive vaporized as well as any liquid refrigerant passed through the rotor-stator gap in the arrow 128 direction. The annular duct or housing 132 is connected with an exhaust duct 134, suitably of tubular configuration, and adapted to carry gaseous as well as liquid refrigerant back into the refrigeration system, as into the evaporator of such a system, at a point above the liquid level of the evaporator, to facilitate greatest flow of effluent from the motor casing 102 and thus provide maximum refrigeration for the motor 100.

Thus in summary the FIGURE 6 embodiment illustrates a method for introducing liquid refrigerant into each end of a motor housing, to be directed into the rotor stator gap for vaporization therein with extraction of heat therefrom to pass axially of the rotor stator gap to a median portion thereof and be exhausted through and from the motor housing and stator at a point spaced between its points of introduction. In this embodiment of the invention, it will be seen that highly efficient cooling is provided by the introduction of the liquid refrigerant into each end of the motor. Further, in this embodiment, provision is made for the removal of both vaporized and unvaporized refrigerant from the motor in a most effective manner. Thus any danger of flooding the motor as by excess liquid refrigerant being introduced thereto, is avoided.

Figure 7:
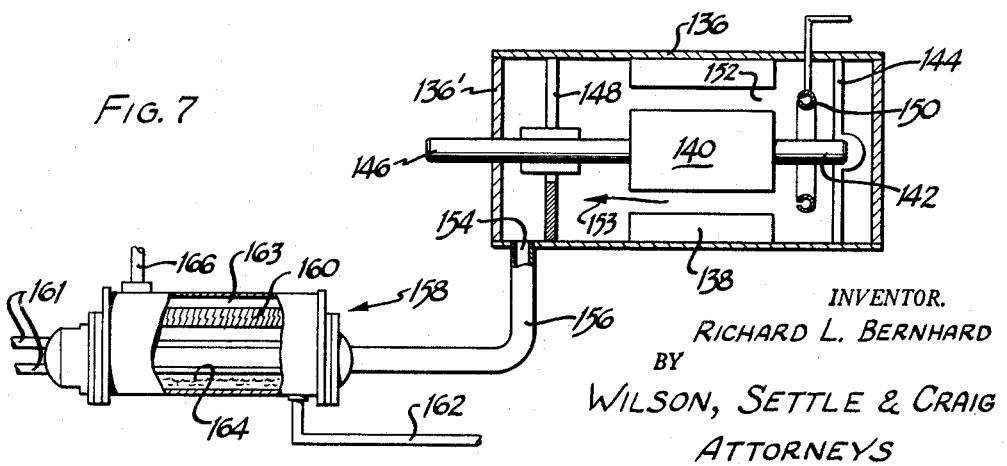
FIGURE 7 is a schematic view showing the manner in which an electric motor can be cooled with liquid refrigerant, with the vaporized refrigerant returned to the refrigeration system evaporator above the fluid level therein.

As shown in FIGURE 7, a further modification of the invention is illustrated. This figure shows the manner in which a motor is adapted to be cooled by passing liquid refrigerant into one end of the rotor-stator gap, through the entire length of the gap and thence out of the motor casing through a conduit leading to the evaporator of a refrigeration system, discharging into the evaporator above the liquid level thereof.

More particularly, the motor of FIGURE 7 includes a sealed casing 136 with a stator 138 therein. Within the stator and coaxially thereof there is positioned a rotatable rotor 140 having a first shaft end 142 extending therefrom and received within a bearing-containing support spider 144. Extending from the other end of the rotor is a second shaft end 146 projecting in sealed relationship out of the end 136' of the motor casing 136. The second shaft end 146 is also supported within a bearing-containing spider 148 for rotation. The shaft end 146 can be suitably connected to a refrigeration compressor or other suitable device for driving the same.

A fluid refrigerant manifold 150, of annular configuration, similar to that described for FIGURE 1 and more particularly shown in FIGURE 4, is positioned to direct liquid refrigerant into one end of the rotor-stator gap 152 of the motor to be vaporized and extract heat from the rotor and stator. In this embodiment of the invention, the vaporized and unvaporized refrigerant pass to the left in the direction of the arrow 153, axially through the rotor stator gap and thence through an outlet port 154 in the lower left hand end of the motor casing 136. It will of course be obvious that the above defined relationship can extend from left to right rather than from right to left as illustrated.

The outlet 154 is connected by means of an enlarged conduit 156, suitably of tubular configuration, to an evaporator 158 of a refrigeration system (not shown). The evaporator includes a shell 160 within which heat exchange lines 161 and a conventional fluid eliminator 163, as described for the FIGURE 1 embodiment, are disposed. A fluid refrigerant line 162 is connected to the bottom portion of the evaporator 158 to admit liquid refrigerant thereinto from a suitable source such as a refrigeration condenser. The fluid refrigerant flows into the evaporator 158, forming a given fluid level 164 therein from which the refrigerant boils to cool the interior parts of the evaporator such as the heat exchange tubes 161 positioned therein. An exhaust line 166 returns vaporized refrigerant from the top of the evaporator 158 back to the refrigeration system, as for example into the intake side of the compressor, for recirculation in the system.

It will be noted that the enlarged exhaust conduit 156 leading from the motor casing 136 to the evaporator 158 connects into the evaporator above the liquid refrigerant level 164, at a median vertical point on the evaporator. Thus a free flow of gas as well as liquid, if any, from the motor casing 136 into the evaporator 158 is provided. By this arrangement, the effluent, including gas and liquid from the motor casing does not encounter any head of fluid in the evaporator as would be the situation were the return line 156 connected into the evaporator 158 at the base portion thereof to be forced to bubble up through the liquid in the bottom of the evaporator. It should be mentioned that the effluent pipe 156 is directed into the evaporator 158 at a point below the liquid separator plates 163 so that the liquid is retained in the evaporator to give up its latent heat of vaporization. This point of discharge also assures the gaseous portion of the motor effluent of having free flow back to the intake of the compressor via line 166.

Thus in the system illustrated in FIGURE 7, a free flow of liquid refrigerant into one end of the motor is provided, into and through the rotor-stator gap for effectively cooling the same by at least partial vaporization of the liquid refrigerant, and then out of the motor casing in unrestricted flow to the low pressure side of the refrigeration system.

As used herein, the terms "motor," "generator" and "dynamoelectric machine" are to be construed as encompassing machines adapted to the conversion, by induction, of electrical energy into mechanical energy, and of mechanical energy into electrical energy. The scope of invention is therefore to be construed to cover both an electric motor and an electric generator, inasmuch as the rotor is rotatable relative to the stator in either situation, the direction of current flow being the essential difference between the two devices.

Having thus described my invention, I claim:

1. The combination comprising a centrifugal compressor having a substantially flat back wall and a curved front wall; an impeller having a series of curved blades between the front wall and back wall; a compressor motor coaxial with said impeller and secured to the housing back wall; said motor comprising an annular casing wall extending from the housing back wall and an end wall closing the open space defined by said annular wall; a stator structure secured within said annular wall; a rotor mounted within the stator structure; a first liquid refrigerant feeding device connected to the annular casing wall adjacent its point of securement with the compressor housing back wall for feeding refrigerant into the space adjacent one end of the rotor; a second liquid refrigerant feeding device connected with and extending through the casing end wall for feeding refrigerant into the space adjacent the opposite end of the rotor; and an expanded refrigerant outlet passage connected to the casing at a point therein between the opposite ends of the stator structure.

2. The combination comprising a refrigerant evaporator; a refrigerant condenser; a refrigerant compressor between the evaporator and condenser; a compressor motor including a casing having a rotor and stator therein; an upright float chamber casing having an inlet adjacent its upper end and two separate outlets adjacent its lower end; a butterfly valve within said float chamber casing controlling flow through one of the outlets; a float positioned above the outlets in the float chamber casing; a thrust rod extending downwardly from said float; lever means between the thrust rod and butterfly valve, whereby when the liquid level in the float chamber tends to fall below a predetermined value the float is lowered to operate the butterfly valve and restrict flow through said one outlet; a line between said one outlet and the evaporator inlet; means for discharging liquid refrigerant into the motor casing; and another line from the other float chamber outlet to the discharging means; said discharge means comprising a refrigerant distribution ring positioned concentric with the rotor and having a series of orifices therein for discharging refrigerant into the gap between the rotor and stator.

3. The combination comprising a refrigerant evaporator; a refrigerant condenser; a refrigerant compressor between the evaporator and condenser; a compressor motor, including a casing having a rotor and stator therein; an upright float chamber casing having an inlet adjacent its upper end and two separate outlets adjacent its lower end; a butterfly valve within said float chamber casing controlling flow through one of the outlets; a float positioned above the outlets in the float chamber casing; a thrust rod extending downwardly from said float; lever means between the thrust rod and butterfly valve, whereby when the liquid level in the float chamber tends to fall below a predetermined value the float is lowered to operate the butterfly valve and restrict flow through said one outlet; a line between said one outlet and the evaporator inlet; means for discharging liquid refrigerant into the motor casing; and another line from the other float chamber outlet to the discharging means; said discharging means comprising two separate feeding devices located at opposite ends of the motor casing, whereby refrigerant is caused to flow into the rotor-stator gap from both ends of the rotor.

4. In a refrigerating system having a refrigerant evaporator, a refrigerant condenser, and a refrigerant compressor; the combination comprising an electric motor, including a rotor and stator, for operating the compressor; means receiving liquid refrigerant from the condenser and feeding it into the rotor-stator gap; and means establishing a suction condition within the rotor-stator gap for withdrawing expanded refrigerant from the motor; said liquid refrigerant feeding means comprising a series of nozzles positioned closely adjacent the rotor-stator gap at circumferentially spaced points therearound so as to discharge directly into the gap.

5. The combination of claim 4 wherein the nozzles are defined by a ring-shaped conduit coaxial with the motor.

6. In a refrigerating system having a refrigerant evaporator, a refrigerant condenser, and a refrigerant compressor; the combination comprising an electric motor, including a rotor and stator, for operating the compressor; means receiving liquid refrigerant from the condenser and feeding it into the rotor-stator gap; and means establishing a suction condition within the rotor-stator gap for withdrawing expanded refrigerant from the motor; said liquid refrigerant feeding means comprising two separate feeding devices discharging into opposite ends of the motor, whereby refrigerant is caused to flow into the rotor-stator gap from two directions.

7. The combination of claim 6 and further comprising a liquid refrigerant trapping means between the condenser and evaporator, including a float chamber having an inlet in its upper portion receiving liquid from the condenser, a first outlet in its lower portion discharging to the evaporator, a second outlet in its lower portion discharging to the liquid feeding means, and a float-valve assembly within said chamber operating to restrict flow through the first outlet when the liquid level in the chamber falls below a predetermined value.

8. In a refrigerating system having a refrigerant compressor, a refrigerant condenser, and a refrigerant evaporator; the combination comprising an electric motor including a rotor and stator for operating the compressor; means receiving liquid refrigerant from the condenser and feeding it into the rotor-stator gap, including two separate feeding devices discharging into opposite ends of the motor so that refrigerant is caused to flow into the rotor-stator gap from two directions; and passage means communicating with central portions of the gap for directing expanded refrigerant back into the refrigerating system.

9. In a refrigeration system having a refrigerant compressor, a refrigerant condenser and a refrigerant evaporator with refrigerant conduits connecting said compressor, condenser and evaporator in operable relationship, and a motor connected in driving relation to said compressor, the motor having a rotor and stator therein with an elongated annular air gap therebetween, and a shaft rotatably supporting the rotor, the shaft having first and second ends, the improvement comprising a sealed casing around the motor, means for feeding liquid refrigerant into said sealed motor casing adjacent the ends of the shaft, conduit means connecting said liquid refrigerant orifices to the refrigerant condenser for injecting liquid refrigerant through said orifices into said sealed casing adjacent each end of the motor shaft, an exhaust opening in the lower portion of said casing spaced between said orifices, and a conduit connecting said exhaust opening to said refrigeration system, whereby liquid refrigerant injected into said casing is at least partially converted to the gaseous state to extract heat from the rotor and stator and is moved generally axially through the motor casing and is exhausted from a median portion of said casing back into said refrigerant system.

10. In a method of operating a refrigeration system having a refrigerant condenser, a refrigerant compressor and a refrigerant evaporator connected in operable relationship, with an electric motor connected to the compressor for driving the same, the steps of directing liquid refrigerant into each end of the electric motor to be at least partially vaporized and extract heat from the motor, moving the refrigerant axially from each end of the motor toward an intermediate portion thereof and withdrawing the refrigerant from a bottom portion of the motor casing.

11. A dyanoelectric machine to be internally cooled by evaporation of liquid refrigerant within the casing, comprising a sealed casing, a stator within said casing, a rotor within said stator and spaced therefrom by an annular gap, a ring member within said casing and positioned concentric with said rotor adjacent an end thereof, said ring member having means for discharge of liquid refrigerant therefrom into said gap, means to supply liquid refrigerant to said ring member, and outlet means for said casing for discharge of refrigerant therefrom.

12. An electric machine to be internally cooled by evaporation of liquid refrigerant within the machine casing, comprising a sealed casing, a stator with said casing, a shaft extending through said stator, a rotor on said shaft and within said stator and spaced therefrom by an annular gap, a hollow annular member surrounding said shaft and positioned concentric with said rotor adjacent an end thereof, said annular member having a plurality of nozzle orifices therein for discharge of liquid refrigerant therefrom into said gap, means to supply liquid refrigerant to the interior of said annular member, and outlet means for said casing for discharge of refrigerant therefrom.

13. In a method of cooling an electric machine having a rotor and stator separated by an annular gap having two open ends, the steps of feeding vaporizable liquid refrigerant directly into the two ends of the gap, reducing the pressure within the gap to simultaneously evaporate at least part of the liquid refrigerant within the gap and withdraw the evaporated refrigerant from the gap.

References Cited in the file of this patent

UNITED STATES PATENTS

| | | |
|---|---|---|
| Re. 24,802 | Kocher | Mar. 29, 1960 |
| 1,928,386 | Meyer | Sept. 26, 1933 |
| 2,184,285 | Codling | Dec. 26, 1939 |
| 2,247,950 | Kucher | July 1, 1941 |
| 2,249,882 | Buchanan | July 22, 1941 |
| 2,277,647 | Jones | Mar. 24, 1942 |
| 2,746,269 | Moody | May 22, 1956 |
| 2,776,542 | Cooper | Jan. 8, 1957 |
| 2,793,506 | Moody | May 28, 1957 |
| 2,891,391 | Kocher | June 23, 1959 |
| 2,913,988 | White | Nov. 24, 1959 |
| 2,964,659 | Steele | Dec. 13, 1960 |
| 3,007,064 | Ward | Oct. 31, 1961 |
| 3,024,366 | Yanagimachi | Mar. 6, 1962 |

FOREIGN PATENTS

| | | |
|---|---|---|
| 279,065 | Great Britain | May 1, 1928 |